United States Patent [19]
Lee

[11] 3,857,575
[45] Dec. 31, 1974

[54] SECURITY TRAILER HITCHING POST

[76] Inventor: James F. Lee, Rt. 4, Box 363, Darlington, S.C. 29532

[22] Filed: Dec. 28, 1973

[21] Appl. No.: 429,108

[52] U.S. Cl.................. 280/1, 280/150.5, 248/351
[51] Int. Cl. .......................................... B60r 27/00
[58] Field of Search............ 280/475, 150.5, 491 A, 280/415, 457, 1; 248/351, 352, 161, 407, 156; 256/1; 119/21; 52/154

[56] References Cited
UNITED STATES PATENTS

| | | |
|---|---|---|
| 2,315,516 | 4/1943 | Gray .................................... 256/1 |
| 3,233,913 | 2/1966 | Brown ............................... 280/507 |
| 3,238,678 | 3/1966 | Barnett ........................... 280/475 X |
| 3,527,355 | 9/1970 | Boyer .............................. 248/156 X |
| 3,717,362 | 2/1973 | Johnson ..................... 280/491 A X |

Primary Examiner—Leo Friaglia
Assistant Examiner—R. Schrecengost

[57] ABSTRACT

Disclosed is a telescoping trailer hitching post having a ball coupling member at its upper end for coupling engagement with a coupling socket at the front end of a trailer tongue, a pair of rings welded to opposite sides of the post, a chain anchored at its one end to one of the rings and adapted to be wrapped around the trailer tongue and locked by means of a padlock to the one or to the opposite ring to prevent theft of the trailer. A ground receptacle is anchored in concrete with its upper end flush with the surface of the ground, and the post is telescoped within the receptacle between a completely housed position within the receptacle and a raised position above the ground. A pair of vertically spaced discs are provided near the bottom end of the post, for cooperative engagement with a vertical key welded to the inside of the receptacle adjacent its top edge to support the post in the raised position and to prevent the post from being pulled out of the receptacle.

9 Claims, 5 Drawing Figures

PATENTED DEC 31 1974

3,857,575

TONGUE OF BOAT TRAILER

SECURITY TRAILER HITCHING POST

BRIEF DESCRIPTION OF THE INVENTION

The invention relates to a security trailer hitching post for boats and the like and more particularly comprises a telescoping trailer hitching post having a ball coupling member at its upper end for coupling engagement with a coupling socket at the front end of a trailer tongue, a pair of rings welded to opposite sides of the post, a chain anchored at its one end to one of the rings and adapted to be wrapped around the trailer tongue and locked by means of a padlock to the one or to the opposite ring to prevent theft of the trailer. A ground receptacle is anchored in concrete with its upper end flush with the surface of the ground, and the post is telescoped within the receptacle between a completely housed position within the receptacle and a raised position above the ground. A pair of vertically spaced discs are provided near the bottom end of the post, for cooperative engagement with a vertical key welded to the inside of the receptacle adjacent its top edge to support the post in the raised position and to prevent the post from being pulled out of the receptacle.

THE PRIOR ART

I am aware that ground inserted posts for trailers are broadly old as shown for example in U.S. Pat. No. 3,238,678 but this patent does not disclose the provision of a ground receptacle into which the post may be telescoped nor does it disclose any means for chaining the trailer to a post to prevent theft.

I am also aware of U.S. Pat. No. 2,956,529 which discloses a trailer stand having a ball coupling but this patent discloses no means to prevent theft and does not disclose the provision of a ground receptacle into which the post may be telescoped when not in use. The device of this patent is believed to be dangerous to one attempting to assemble a boat and trailer to the trailer stand, whereas my device avoids this hazard.

I am also aware that ground receptacles for receiving posts either in non-use hidden conditions or for supporting posts in an extended above ground position are broadly old as disclosed for example in U.S. Pat. Nos. 1,164,909; 2,315,516; and 3,527,355.

I am however not aware of any prior art which discloses the combination of a ball coupling mounted on top of a post which post is adapted to completely telescope within a ground receptacle and to be partly withdrawn from a hidden retracted position to an extended position above the ground in which position the post may be readily assembled with a complementary fitting carried by the trailer tongue or the like and may be further secured to the tongue as by means of a chain and padlock.

OBJECT OF THE INVENTION

The primary object of the invention is to provide an improved trailer hitching post adapted to be completely housed in a ground receptacle and to be partly withdrawn from the receptacle while still secured thereto and while in the raised position to be readily attached and securely padlocked to a portion of a trailer equipped with means for ready attachment to complementary means carried by the post.

THE DRAWINGS

The invention will be more readily understood by reference to the accompanying drawings and the following detailed description.

In the drawings:

FIG. 1 is a perspective view of my improved security trailer hitching post shown in operative position with the upper end of the post shown attached and locked to a portion of the tongue of the boat trailer or the like;

DETAILED DESCRIPTION

Figure 1:
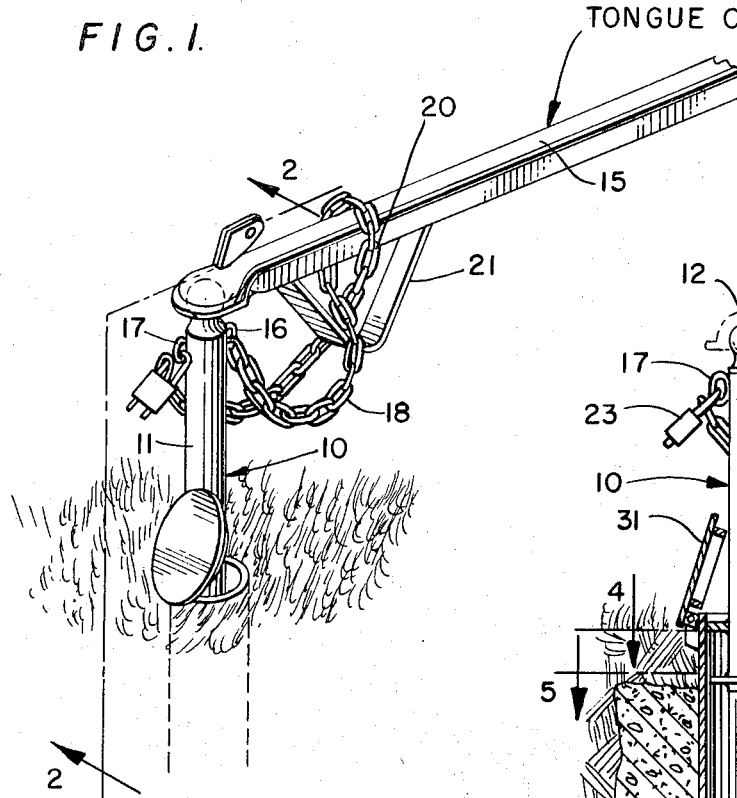

Referring to the drawings, the reference number 10 denotes generally improved telescopic hitching post of the present invention comprising a vertically reciprocable post member 11 having a conventional ball coupling member 12 secured at its upper end by any suitable means as by screw-threaded connection 13, intended for coupling engagement with a complementary coupling socket 14 located beneath the front end of a trailer tongue 15. The tongue 15 is shown partially broken away and may be the tongue of a trailer for a boat or the like, the boat not being shown.

The post member 11 is shown as provided at its upper end with a pair of rings 16 and 17 welded to opposite sides of the post member 11. Suitable fastening means, comprising a chain 18, is anchored at one end 19 to one of the rings 16 and is adapted to be wrapped around the tongue 15 with a loop 20 extending through a ground engaging member 21, shown in the form of a strap, connected at its ends to the underside trailer arm adjacent the socket connection and providing an opening through which the chain 18 extends.

The end 22 of the chain 18, which is remote from the end 19 connected to the ring 16, is secured to the ring 17 and the chain 18 may be locked in position by means of a padlock 23 to either one of the rings, herein shown as the ring 17 to prevent theft of the trailer, the tongue of which is fragmentarily represented at 15. The trailer may carry a boat (not shown) or other suitable device.

A suitable ground receptacle 25 is provided for the post 11, herein shown as of tubular form, open at the top and having bottom portion 26 perforated as at 27 to permit water to flow out into a pervious medium 26 below which may be the ground or pervious medium such as gravel.

The ground receptacle 25 may be of any suitable material, preferably metal and is shown as permanently embedded in concrete 29 with the upper end 30 substantially flush with the ground. The post member 11 is adapted to telescopically fit within receptacle 25 and may be moved from a completely housed inoperative position shown in FIG. 3 and a raised position shown in FIG. 2 wherein the post 11 is principally above the ground. When in the raised position or operative of FIG. 2, the ball portion 12 of the post is adapted to be readily assembled with the corresponding socket member 14 of the trailer tongue 15. FIG. 3 on the other hand shows the inoperative or housed position of the trailer hitching post with the post member 11 disconnected from the trailer tongue and completely housed with the receptacle 25.

Figure 2:
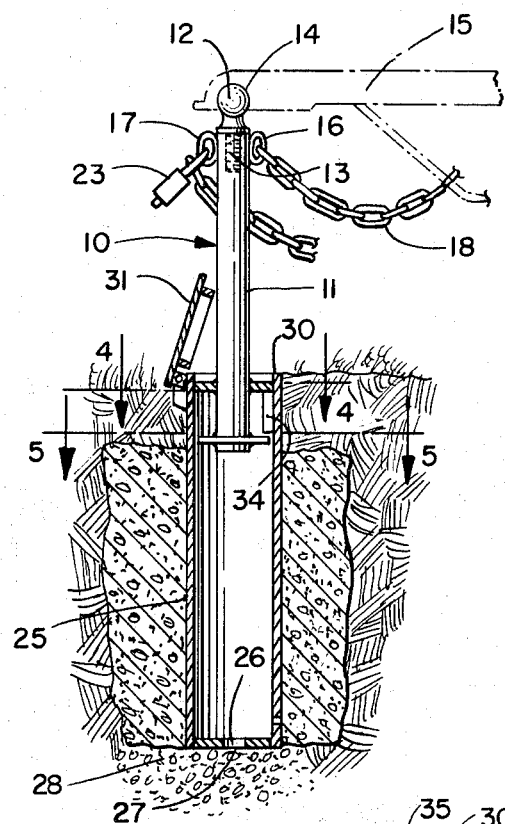
FIG. 2 is a similar view with parts shown in longitudinal section.
Figure 3:
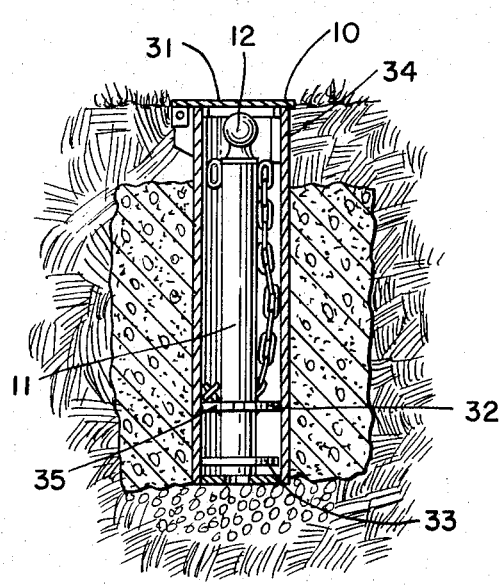
FIG. 3 is a view similar to FIG. 2 but with the post shown retracted within the ground receptacle.
Figure 4:
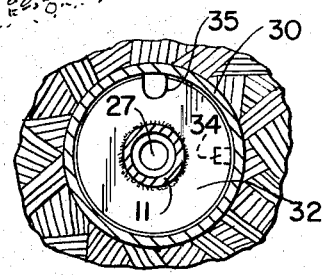
FIG. 4 is a transverse section on line 4—4 of FIG. 2.
Figure 5:
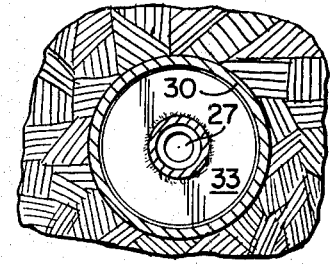
FIG. 5 is a transverse section on line 5—5 of FIG. 2.

The receptacle 25 is preferably provided with a hinged cover 31 which may be closed to prevent entry of water as in FIG. 3 or may be raised as in FIG. 2 to permit the post member 11 to be attached to trailer tongue 15. Any water which may accumulate within receptacle 25 when the cover is open, may trickle out through the perforated bottom 26 into the pervious ground medium 28 below.

In accordance with my invention suitable means are provided to permit the post member 11 to be moved from its lowered or inoperative position within the ground, to its raised or operative position shown in FIG. 2 without permitting complete removal of the post member 11 from the receptacle 25. Such means permits the post member 11 to be supported at the top of the receptacle 25 but not being completely removable therefrom. As shown a pair of vertically spaced discs 32 and 33 are provided near the lower end of the post member 11. The diameters of these discs is substantially equal to the inside diameter of the tubular receptacle 25 and the discs are spaced apart sufficiently so as to prevent undue wobbling of the post member while permitting some lateral movement of the upper end of the post.

Means are provided to prevent removal of the post member from the ground receptacle and at the same time to support the post in the raised position. As shown a key or rib 34 is permanently secured to the interior of the ground receptacle as by welding, while the lower portion of the post member 11, including the discs 32 and 33 is in the lowered position shown in FIG. 3. The key 34 when secured in place prevents unauthorized removal of the post member 11 from the receptacle 25. To permit the upper disc 32 to pass the rib the disc 32 is provided with a slot 35 of sufficient depth to pass the rib 34 when brought into alignment therewith. The lower disc 33 is not slotted and accordingly unauthorized removal of the post is prevented by the rib 34 as indicated in FIG. 2. By suitably rotating the post member 11 and discs 32 and 33 after the slotted portion 35 of the disc 32 has passed the rib 34 the disc 32 may be supported upon the top of the rib 34.

OPERATION

The operation of the device will be largely apparent from the foregoing description. The trailer hitching post 10 is shown in its inoperative position in FIG. 3 with the post member 11 including the ball coupling member 12 completely housed with the ground receptacle 25 and with the cover 31 closed to prevent entry of water.

To assemble the post with a boat trailer or the like so as to prevent unauthorized removal of the trailer the post member 11 is raised to the position shown in FIG. 2 with the slotted disc 32 resting on the top of the rib 34 and with the lower disc 33 below the rib, which rib prevents complete removal of the post member from the receptacle. The ball 12 at the top of the post member 11 is then readily assembled with the socket member 14 of the trailer tongue 15 and the post member 11 and then further secured together by the chain hitch 18 and preferably the padlock 23 as previously described. A boat (not shown) or other device is secured to the trailer, indicated by the fragmentary trailer arm 15, in any suitable manner.

While the materials used are not the essence of the invention the receptacle 25, chain 18, post 11 and discs 32 and 33 are preferably of steel and the chain 18 is preferably case hardened.

The invention has been described in detail for the purpose of illustration but it will be obvious that numerous modifications and variations may be resorted to without departing from the spirit of the invention as defined in the following claims.

What is claimed is:

1. A telescoping hitching post assembly device comprising a fixed ground receptacle, a post member adapted to be completely housed within the receptacle or to be withdrawn from the receptacle for attachment to a tongue portion of a trailer for boats or the like, coating means carried by the post member and receptacle for retaining the post member secured to the receptacle when in the withdrawn position, means carried at the top of the post member for ready attachment to a complementary member carried by the trailer tongue, and other means for securing the trailer to the post member to prevent theft, said post member being provided with a pair of spaced discs near the bottom thereof and the receptacle is provided with an internal rib, the upper of said discs being provided with a slot to permit the discs to pass the rib when the rib and slot are in alignment, and the lower of said discs being adapted to engage the rib to prevent complete removal of the post member from the receptacle when the post member is in raised position, said discs and rib comprising said coacting means.

2. A telescoping hitching post assembly device as set forth in claim 1 wherein the other means includes a chain hitch or loop.

3. A device as set forth in claim 1 wherein the other means includes a pair of rings secured to opposite sides of the upper portion of the post member and a chain secured at its opposite ends to said rings and including an intermediate chain hitch or loop portion connected to said tongue portion.

4. A device as set forth in claim 1 wherein the other means includes a padlock.

5. A device as set forth in claim 1 wherein the post member is provided at its upper end with a ball member adapted to readily and releasably engage a complementary socket member carried by the trailer tongue.

6. The device as set forth in claim 1 wherein the ground receptacle is perforated to permit any accumulated moisture to escape therefrom.

7. A device as set forth in claim 1 wherein the ground receptacle is provided with a hinged cover to prevent entry of water when the hitching post is housed therein.

8. A telescoping hitching post assembly device comprising a fixed ground receptacle, a post member adapted to be completely housed within the receptacle or to be withdrawn from the receptacle for attachment to a tongue portion of a trailer for boats or the like, coacting means carried by the post member and receptacle for retaining the post member secured to the receptacle when in the withdrawn position, ball means carried at the top of the post member for ready attachment to a complementary member carried by the trailer tongue, and other means for securing the trailer to the post member to prevent theft, said post member being provided with a pair of spaced discs near the bottom thereof and the receptacle being provided with an internal rib, the upper of said discs being provided with a slot to permit the discs to pass the rib when the rib and slot are in alignment, and the lower of said discs being adapted to engage the rib to prevent complete removal of the post member from the receptacle when the post member is in raised position, said other means comprising a pair of rings secured to opposite sides of the upper portion of the post member and a chain secured at its opposite ends to said rings and including an intermediate chain hitch or loop portion connected to said tongue portion, and padlock means securing one end of said chain to one of said rings.

9. The device as set forth in claim 8 wherein the ground receptacle is perforated to permit any accumulated moisture to escape therefrom.

* * * * *